United States Patent [19]
Kotoc

[11] 3,822,609
[45] July 9, 1974

[54] CONNECTING ROD
[75] Inventor: Stefan Kotoc, Praha, Czechoslovakia
[73] Assignee: Ustav pro vyzkum motorovych vozidel, Praha, Czechoslovakia
[22] Filed: Apr. 17, 1972
[21] Appl. No.: 244,663

[52] U.S. Cl. .............................. 74/579 E, 74/588
[51] Int. Cl. ............................................ F16c 7/08
[58] Field of Search .................. 74/588, 579 E, 579

[56] References Cited
UNITED STATES PATENTS
1,766,024   6/1930   Jones ............................ 74/579 EX
1,829,305   10/1931  Sneed ................................. 74/579
2,120,016   6/1938   Bugatti ................................ 74/588
3,131,576   5/1964   Schilberg ........................... 74/588

FOREIGN PATENTS OR APPLICATIONS
604,501   5/1926   France .................................... 74/588

Primary Examiner—Samuel Scott
Assistant Examiner—F. D. Shoemaker
Attorney, Agent, or Firm—Murray Schaffer

[57] ABSTRACT

A connecting rod comprising a shank and at least one end connecting member, formed entirely of layers of strip sheet steel.

9 Claims, 10 Drawing Figures

PATENTED JUL 9 1974 3,822,609

CONNECTING ROD

BACKGROUND OF INVENTION

The present invention relates to connecting rods for internal combustion engines and their method of construction.

Known connecting rods are substantially rigid, very solid, shaped rods which are manufactured by the steps of forging, heat treatment and machining of suitable billets of carbon or alloy steels. The tensile strength of connecting rods manufactured in this manner can reach approximately 50 to 80 kg/mm$^2$. Frequently however, the process steps, as for example the machining operation, creates structural defects in the finished product, which diminishes its strength. It is, therefore, common to increase the dimensions of the rod to overcome this weakness. This, however, results in an increase in the mass and weight of the rod which, in turn, cause the production of greater dynamic forces during their actual use, in the engine. This further causes an increase in friction between the wearing surfaces of the moving parts especially the bearings and seals of the piston and cylinder.

These disadvantages are overcome by the present invention whose object it is provides a connecting rod of light weight and low mass.

A further object of the present invention is to provide a simple, economical means for producing connecting rods having low mass and weight, and low friction. Such rods can be used especially for internal combustion engines.

SUMMARY OF INVENTION

According to the present invention, a connecting rod is formed of steel sheet, preferably formed by stamping the same from an endless strip of plain steel of cold rolled hoop iron.

According to the desired end use, and engine environment in which the rod is to be used, the rod may be manufactured in many sizes, shapes and variations. For example, the rod may be formed of two symetrical bundles of strip material which are bolted together with or without a separable cover. Also the rod may be formed of two parts, each being a single stamping form from an endless strip or belt of sheet steel.

The strut strength and the handling or flexing strength of the connecting rod may be greatly increased by forming the cross section of the sheets in the shank of the rod in shaped profiles. Shaping the sheets in the ends of the rod will also strengthen the flexing strength.

Full details of the present invention are given in the following disclosure and in the accompanying drawings.

DESCRIPTION OF INVENTION

Figure 1:
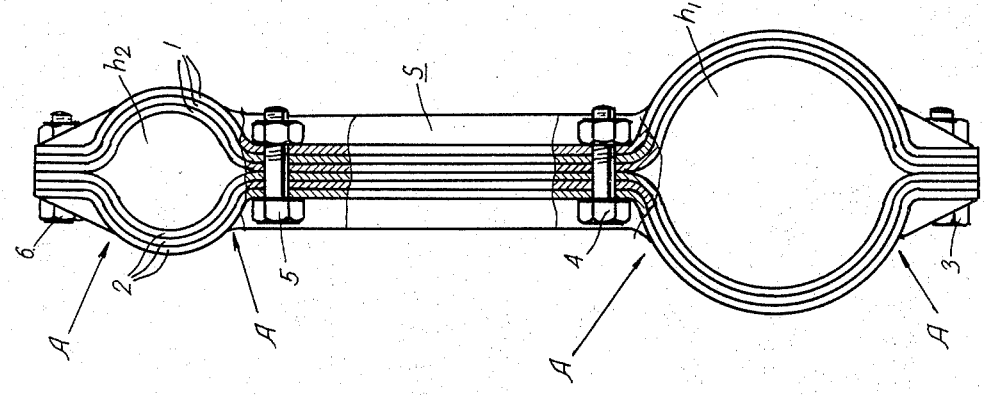
FIG. 1 is a vertical section through a connecting rod made in accordance with the present invention

Turning to FIG. 1 the present invention is found in a connecting rod formed in more or less conventional shape having an elongated shank S at each end of which is a circular hub or socket h1 and h2 adapted to fit about a wrist pin, crank or similar engine part. The connecting rod of FIG. 1 is generally symmetrical about its central longitudinal axis and is formed of right and left hand, portions 1 and 2, which are substantially mirror images of each other. Each of the portions, 1 and 2, are formed as a bundle or an assembly of a plurality of sheet steel strips, laid one on each other, and bent or curved to obtain the shape of the rod half. The bundles are bolted together by means of fasteners 3, 4, 5 and 6 which are arranged in pairs to either side of the circular hubs h1 and h2. The bolts 4 and 5 secure the shank half portions while the bolts 3 and 6 secure the outer edges of the rod. The bundled sheets forming the right and left portions 1 and 2 are deformed in cross section shown generally by the numerical A to provide strengthing ribs, running substantially along the length of the shank S and to the inner and outer ends of the circular hubs h1 and h2.

Figure 2:
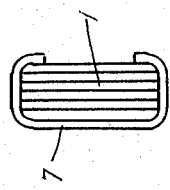
FIG. 2 is a sectional view through the shank of the connecting rod according to FIG. 1 showing the shape thereof
Figure 3:
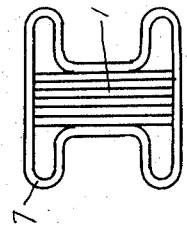
FIG. 3 is a view similar to FIG. 2 showing another shape
Figure 4:
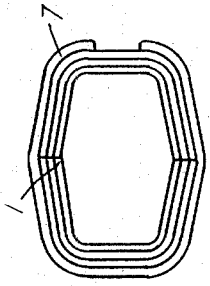
FIG. 4 is a view similar to FIG. 2 and showing a third shape

As seen in FIGS. 2, 3, and 4, the sheet bundles or assemblies of layered strips, may be formed in a variety of cross sectional shapes which may be pulled or deformed during the stamping operation, while simultaneously the size and longitudinal shape can be also obtained. As seen in FIG. 2, the bundles may each have a V shaped cross section joined at their apex, by a rivet, instead of a bolt, to form together an X-shaped cross sectional rod. In FIG. 3 each bundle is more or less U-shaped, joined by a rivet or a bolt at their bight section. In FIG. 4 the U-shaped members are joined at their arms which are flanged outwardly to meet. The arms are welded.

The bundles themselves may be formed of two or more sheets of steel, the number will depend on the gauge of steel and the degree of inflexibility and strength required. The bolts 4 and 5 fixedly secure the sheets in each bundle of the shank portions together while simultaneously holding the shank rigid. The end bolts 3 and 6 serve the same purpose, but are adapted to be loosened, so that the circular hubs at each end may be opened. The sheets of each bundle may then be distended to allow the rod to be easily connected to the appropriate wrist pins, crank shafts, etc.

Figure 5:
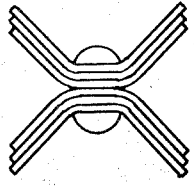
FIGS. 5, 6, and 7 are views similar to FIGS. 2-4 showing still other shapes of rods, and employing cover or eveloping members
Figure 6:
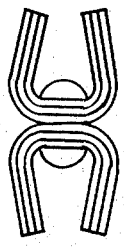
Figure 7:
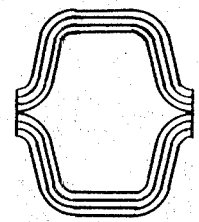

FIGS. 5, 6 and 7 demonstrate the methods of strengthening the connecting rod shank against strain or flexing. Sheet metal or steel clips 7, of a length extending from one hub to the other are snapped about the bundle of sheet steel members forming the rod to envelope the same. The clips 7 may be applied during the bending and forming of the portions 1 or 2 as the outer layer of steel sheet or they may be later bolted or welded to the shank. The clips 7 may be suitably formed, not only to strengthen the shank portion, but to also function as a cover or envelope for the connecting rod. In FIG. 5, a U-shaped clip is formed while in FIG. 6 a more elaborate I-shape cover member is formed, both of which are adapted to encircle the shank of a two-part connecting rod of the types shown in FIG. 1. In FIG. 7, a generally rectangular shaped cover member is shown to envelope a correspondingly profiled shank which is welded together at its ends.

Figure 8:
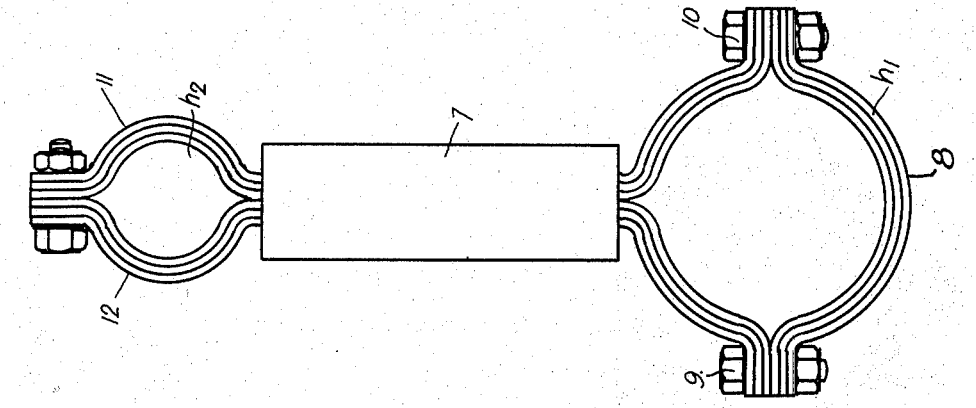

In FIG. 8, a variation of the constructions seen in FIGS. 1–7 is shown when the connecting rod is further divided and formed with a third portion 8, also made of a plurality of sheet steel strips. Here the rod is split along a plane, through one of the hubs or connecting members, perpendicular to the longitudinal plane of the connecting rod. The circular hub is thus formed of two-semi circular elements, which may then be held together by bolts 9 and 10. In this Figure, the exterior of a longitudinal clip 7, is shown enveloping the shank of the bundle portions 11 and 12.

Figure 9:
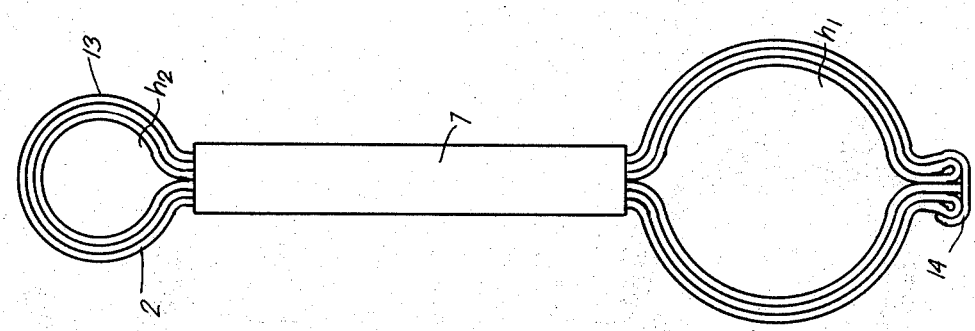

In FIG. 9, there is demonstrated a connecting rod made of one continuous strip or belt of steel 13, bended and folded over each other to form assemblies of right and left bundles or portions having strips of steel overlaying each other. The rod is connected by the continuous band 13 at one end while at its other end is connected by a single terminal clip 14, which may be separately formed or formed from the end portion of the steel strip, in the manner of a hinge, itself, as shown. The shank 20 of this embodiment may be screwed or bolted together or it may be welded or enveloped by suitable clips according to any one of the methods of FIGS. 1–7.

Figure 10:
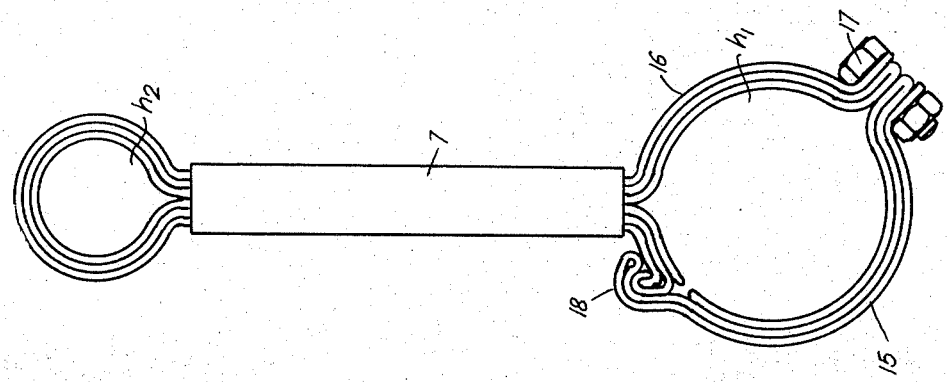
FIGS. 8, 9, and 10 are views similar to FIG. 1 showing further modified forms of connecting rods including separable hub connections.

In FIG. 10, a connecting rod having a separate hub portion 15 such as seen in FIG. 8, is shown formed by bending a single strip of steel according to FIG. 9. The cover 15, is bolted at one end by fasteners 17 and at the other by an integrally formed clip 18.

It will be seen that in all the variants and embodiments, the connecting rod is formed entirely of strip sheet material. Such material generally is defined as having a substantially indefinite or endless length, and a relatively narrow width, with a still smaller thickness, the dimensions vary, depending on the intended use but will maintain their relative proportions.

The assembly of strip material according to this invention has great advantages over forged material as connecting rods having a threefold greater strength (i.e., up to 150 kg/mm$^2$) can be made. This enables a proportioned decrease in the mass and weight of the rod. In addition, the use of plural layers of sheet material distributes the load more easily and has better compliance and response to the impressed loads. In this way, a greater uniformity of bearing load may be achieved without the need for providing expensive and complex machinery, forging and similar steps to insure the absolute accuracy of the shape and form of the rod.

The connecting rod may be easily formed of strip steel of cold rolled hoop iron, as a base material. Such material is usually manufactured with great accuracy in very fine tolerances of 0.01 mm thickness and of 0.1 mm widths, with any suitable surface finish. Connecting rods formed in accordance with this invention consume minimum amounts of material, since the sizes and shapes may be accurately cut and stamped from the steel strip. The 30 to 40 steps heretofore necessary to form a connecting rod can be reduced to about three steps, even if the connecting rod of the present invention is to be heat treated.

As noted previously, it is preferred that the steel strip be stamped or punched simultaneously into the size or shape. Several layers may be simultaneously processed or each layer separately formed. Other techniques for sizing and shaping may also be used. In any event, the present invention eliminates the need for excessive machinery and thus reduces the number of process steps involved in the making of suitable connecting rods. The reduction in the steps necessary to produce the present connecting rod has the advantage of reducing the factory handling time, process storage and similar production problems, all resulting in a significant drop in the cost of manufacture.

According to the present invention, connecting rods may be made having 50 percent less mass, because of the more uniform loading in the cross section of the rod. A simplified connection at the hubs can also be effected, so that the journalling of the rods to the crankshaft, wrist pins, etc. is eased. Even if an increase in the rigidity of the journal box is required, the journalling will be simplified. Furthermore, the decrease in mass and weight will reduce engine friction, parasitic output, vibration and noise. Consequently, the connecting rod, crankshaft and engine will have a longer life span.

Great financial savings are obtained from the present invention, in that strip steel is much cheaper than forged billets and the lack of waste in the use of such material contribute significantly to the resultant economics. Savings of space, manual handling and storage of large heavy members is no longer required. Further, the present invention lends itself to automated techniques.

Still another advantage arises from the fact that prototype manufacture and variable dimensions rods can be made easily and simply without the need for special, uni-purpose, tools and stamping jigs.

The covering or enveloping clip for the layered bundles of sheet steel increases the strut strength and permits flexing. Various forms are possible for the covering clip and it may extend the entire length or only partially between the connecting rods.

The present disclosure is illustrative only of the present invention pointing out several embodiments and variations. Other modifications will be obvious to those skilled in this art.

What is claimed:

1. A connecting rod symmetrical about a longitudinal plane comprising a shank having means on at least one end for connection to another member, said shank and said connection being formed entirely by at least two contiguous layers of continuous sheet steel material on at least each side of said longitudinal plane.

2. The connecting rod according to claim 1, wherein said shank and connecting means are formed from a continuous band of sheet steel material shaped to the desired form by winding said band on itself in at least two layers.

3. The connecting rod according to claim 1, wherein said shank and connecting means are formed in two sections, each section comprises at least two sheet steel strips shaped in mirror image of each other, and means for connecting said sections together.

4. The connecting rod according to claim 1, wherein said connecting means has a fixed portion and a separable portion secured together by removable fastening means.

5. The connecting rod according to claim 4, wherein said separable portion is hinged to said fixed portion.

6. The connecting rod according to claim 5, wherein said rod is formed of a continuous strip of steel, and said separable portion is hinged to said fixed portion by said strip.

7. The connecting rod according to claim 1 in that said rod shank has a cross shape cross section.

8. The connecting rod according to claim 1, wherein said connecting means have a shaped cross section.

9. The connecting rod according to claim 1, including a cover member enveloping said shank.

* * * * *